March 22, 1966  B. R. WALBURN  3,242,419
VARIABLE VOLTAGE TRANSFORMER SYSTEM
Filed Jan. 3, 1963  9 Sheets-Sheet 1

INVENTOR.
Benjamin R. Walburn
BY Webb, Mackey & Burden
HIS ATTORNEYS

INVENTOR.
Benjamin R. Walburn
BY Webb, Mackey & Burden
HIS ATTORNEYS

March 22, 1966  B. R. WALBURN  3,242,419
VARIABLE VOLTAGE TRANSFORMER SYSTEM
Filed Jan. 3, 1963  9 Sheets-Sheet 3

INVENTOR.
Benjamin R. Walburn
BY Webb, Mackey & Burden
HIS ATTORNEYS

INVENTOR.
Benjamin R. Walburn

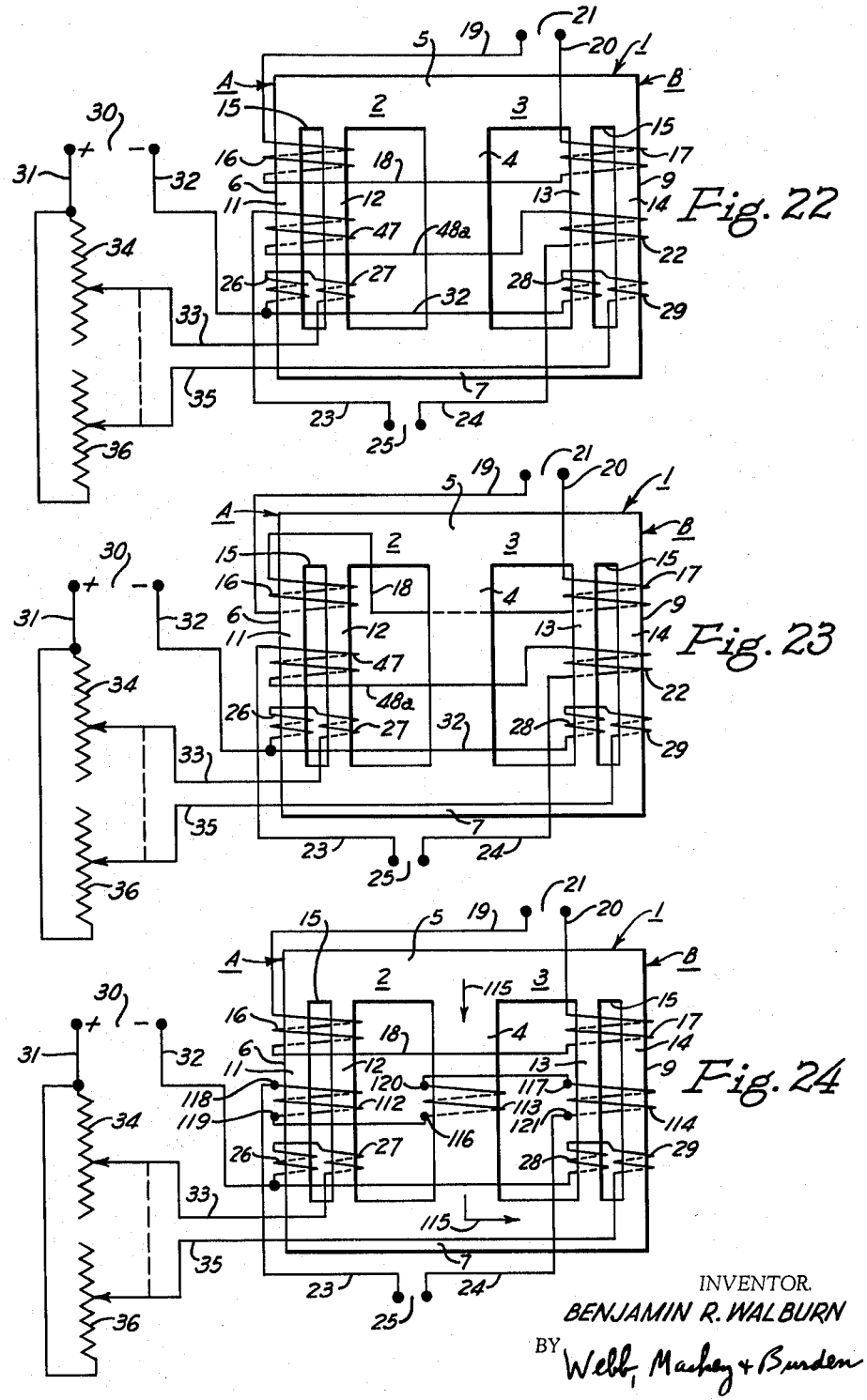

March 22, 1966  B. R. WALBURN  3,242,419
VARIABLE VOLTAGE TRANSFORMER SYSTEM
Filed Jan. 3, 1963  9 Sheets-Sheet 9

INVENTOR.
BENJAMIN R. WALBURN
BY Webb, Mackey & Burden
HIS ATTORNEYS.

United States Patent Office 3,242,419
Patented Mar. 22, 1966

3,242,419
VARIABLE VOLTAGE TRANSFORMER SYSTEM
Ben R. Walburn, 6403 Canterbury Road, Parma 29, Ohio
Filed Jan. 3, 1963, Ser. No. 249,193
56 Claims. (Cl. 323—56)

This application is a continuation-in-part of my application Serial No. 53,665, filed September 2, 1960, and relating to a Variable Voltage Transformer, and a continuation-in-part of my application Serial No. 199,151, filed May 31, 1962, and relating to a Variable Voltage Transformer and Method of Generating Given Amounts of Output Voltage from Same, now both abandoned.

This invention relates to variable voltage transformer apparatus for providing constant output voltage under load, power transformers, and particularly to transformer apparatus comprising two transformers disposed upon a common magnetizable core. The apparatus, in addition to primary and secondary windings, has control windings for regulating flow of magnetic flux through at least one portion of the magnetizable core. One embodiment of my transformer apparatus with a single secondary coil provides a constant output voltage under load over a range from 100% of secondary voltage down through 0 and up to 100% of secondary voltage which is 180° out of phase with the first-mentioned secondary voltage. A second embodiment of my transformer apparatus with two secondary coils connected in series provides a constant output voltage under load over a range from about 2% to about 100% of secondary voltage.

A third embodiment of my transformer apparatus provides a constant output voltage under load over a range from 100% of secondary voltage down through 0 and up to 200% of secondary voltage which is 180° out of phase with the first-mentioned secondary voltage.

Continuous and smooth control over a wide range of induced or output voltages of a transformer has many advantages for the electrical industry but, so far, has been unattainable. Output or induced voltage of a transformer is proportional to three factors; namely, amount of excitation flux linkages or flow between primary and secondary windings, frequncy and ratio of the number of turns of the primary winding and the number of turns of the secondary windings. Thus, regulation of one of these three factors will provide a control over output voltage. Since frequency is fixed for a given set of conditions, it has not been used for control of output voltage. Accordingly, the electrical industry has turned to regulation of the ratio of the number of turns of the primary windings and the secondary windings for a rough control over output voltage rather than control of the amount of exciting flux flow between primary and secondary windings.

As a result, output or secondary voltage of transformers has been controlled principally by tap changers on the secondary windings which vary the number of secondary turns utilized to raise or lower output or operating voltage. However, tap changers have distinct disadvantages in that when the output voltage is to be increased or decreased, the transformer must be disconnected from the circuit in order to change from one tap to another, thus, in most instances, interrupting current flow. In addition, tap changers do not provide a continuous and smooth control over output voltage but a stepped control with inability to achieve regulation over those voltages falling between the voltages obtained from use of successive taps.

Some transformers effect a decrease or increase in output voltage by moving the tap changers while the transformer carries a load and is in circuit. In this case, special equipment is required, namely, switches connected to the taps to be changed and/or an impedance, usually a reactor, to limit circulating current when adjacent taps are connected into the circuit or are connected together.

Direct current saturable reactors have been used to regulate alternating current voltage, but these reactors are unsuited for many applications due to a poor power factor resulting from high impedance at low degrees of D.C. saturation.

My invention provides variable voltage transformer apparatus which delivers a continuous, regulated or controlled, output voltage under load over a range from 100% of secondary voltage down through 0 and up to 100% of secondary voltage 180° out of phase with the first-mentioned secondary voltage in the case of a single secondary coil and, in the case of two secondary coils, over a range from about 2% to about 100% of secondary voltage in one embodiment. In a second embodiment having two secondary coils, the range is from 100% of secondary voltage down through 0 and up to 200% of secondary voltage which is 180° out of phase with the first-mentioned secondary voltage. Through control of the amount of core iron available to the primary windings of two transformers by regulated D.C. flux saturation of parts of the common magnetizable core, regulation of amount of excitation and load flux linkages with the secondary winding or windings results, thus effecting output voltage and power. Specifically, my transformer apparatus comprises first and second transformers, each including a primary winding capable of withstanding full applied voltage. The two primary windings are disposed upon a common magnetizable core which has two parts and a center leg. Each part has a leg comprising two segments disposed in parallel magnetically.

The two primary windings are series connected and disposed with one winding on each of the two parts. On one of the two parts is a secondary alternating current winding.

Each leg comprising the two segments has a unidirectional current winding on each segment with the unidirectional current windings on the two segments of their respective leg being connected series opposing. The unidirectional windings on one leg comprising the two segments are separate and independent electrically from the undirectional windings on the other leg which has the two segments. The unidirectional windings on each of their respective legs are connected to a means such as rheostats or magnetic amplifiers for regulating the amount of unidirectional current flowing therethrough.

A second embodiment of my invention locates the secondary winding on the center leg and a third embodiment uses two secondary alternating current windings connected in series with one secondary winding on the center leg and the other secondary winding on one of the two parts. A fourth embodiment has the two primary windings connected series opposing instead of series aiding in combination with a single secondary winding on one of the two parts. A fifth embodiment has the two primary windings series opposing and two secondary windings connected in series and disposed so that one winding is on the center leg and the other is on one of the two parts.

A sixth embodiment of my invention employs in combination with the two transformers, the common magnetizable core, the two series connected primary windings and the control windings, three secondary windings series connected as described hereinafter and disposed one upon each part and one upon the center leg.

My invention also includes the foregoing combinations of two transformers, two series connected primary windings and the secondary windings together with the common magnetizable core, but with only one of the parts having the two segment leg on which is a single set of the unidirectional control windings and with the center leg also having the two segments and the unidirectional current control windings.

Additionally, my invention resides in a method of inducing a given amount of output voltage from the transformer apparatus by impressing a voltage upon the two primary windings connected in series, delivering a unidirectional current to the unidirectional current windings and regulating the amount of unidirectional current delivered to each two segment leg of the two parts to controllably saturate same and thereby produce a given amount of output voltage in at least one secondary alternating current winding disposed on one of the center leg and of one of the two parts in those embodiments wherein the primary windings are connected series aiding. As to those embodiments wherein the primary windings are connected series opposing, I produce a given amount of output voltage in the same manner in one secondary alternating current on one of the two parts or in two secondary alternating current windings connected in series and with one winding on the center leg and the other winding on one of the two parts.

The purpose of the unidirectional windings on each of the legs comprising two segments is to controllably saturate the legs with D.C. flux, thereby effectively controlling the amount of A.C. excitation flux that will flow in each leg.

In the accompanying drawings, I have been shown preferred embodiments of my invention in which:

FIGURE 22 is a schematic diagram showing a ninth embodiment of my transformer;

FIGURE 23 is a schematic diagram showing a tenth embodiment of my transformer;

FIGURE 24 is a schematic diagram showing an eleventh embodiment of my transformer;

Figure 1:
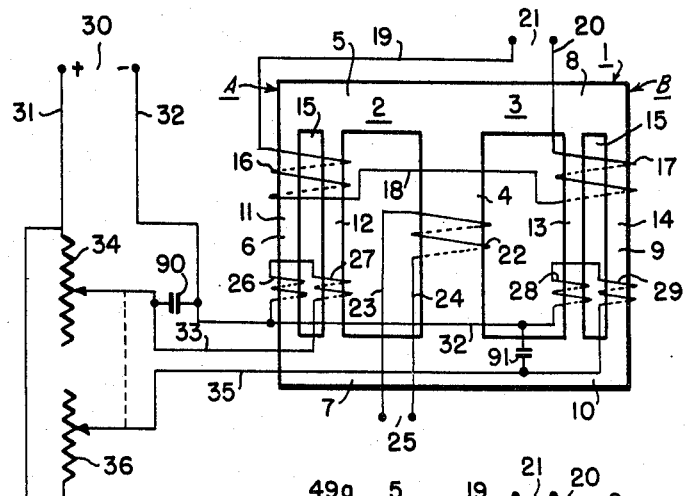
FIGURE 1 is a schematic diagram of one embodiment of my transformer.

Referring to FIGURE 1, my transformer apparatus comprises two transformers A and B disposed upon a common magnetizable core 1 made from laminated, thin transformer steel sheets to form a core structure. This core structure has two parts 2 and 3 connected to a center leg 4. Part 2 has three legs 5, 6 and 7, and part 3 also has three legs 8, 9 and 10 with all legs including the center leg interconnected magnetically. Legs 6 and 9 form the outside legs of the core structure.

As shown in FIGURE 1, legs 6 and 9 each have two segments 11 and 12 and 13 and 14, respectively, disposed in parallel with an air space 15 therebetween. The cross-sectional areas of each of the segments are substantially equal and the combined cross-sectional areas of the two segments of each outside leg 6 and 9 are equal to the cross-sectional area of the center leg 4. Thus, the reluctances of each segment are substantially equal and the reluctances of the outside legs and the center leg are also substantially equal.

On leg 6 is a first primary winding 16 of the transformer A and on leg 9 is a second primary winding 17 of the transformer B with a conductor 18 connecting the two primary windings in series aiding relationship. Accordingly, the primary windings send flux through the outside legs of the core structure in the same direction. Conductors 19 and 20 connect the primary windings to a source of A.C. power 21.

Each primary winding is able to withstand full applied voltage at normal design flux density in its own magnetic circuit which, for primary winding 16, includes the center leg 4 and legs 5, 6 and 7, and, for primary winding 17, includes the center leg 4 and legs 8, 9 and 10.

A secondary winding 22 is on the center leg 4 and conductors 23 and 24 connect the secondary winding to an A.C. load 25. The ratio of the number of its turns to the number of turns of the primary windings and the amount of flux flow through the center leg determine whether the secondary output voltage is stepped up or stepped down. As shown in FIGURE 1, the primary windings 16 and 17 and the secondary winding 22 each have the same number of turns.

On each segment of the outside legs 6 and 9 is a control winding with segments 11, 12, 13 and 14 having control windings 26, 27, 28 and 29, respectively. Control windings 26 and 27 on outside leg 6 are connected series opposing as are control windings 28 and 29 on outside leg 9 so that A.C. voltages induced in them by the flow of excitation flux in the same direction in segments 11 and 12 as one part of the magnetic circuit and in segments 13 and 14 as the other part of the magnetic circuit are in opposition and, accordingly, neutralize or cancel each other.

The series opposing connection of the control windings of a pair of segments such as 11 and 12 avoids effective D.C. flux flow in the core 1 outside of the pair of segments.

Control windings 26 and 27 are connected to a D.C. source 30 by conductors 31, 32 and 33 with a first rheostat 34 in circuit with conductors 31 and 33 and control windings 28 and 29 are connected to the D.C. source by conductors 31, 32 and 35 with a second rheostat 36 in circuit with conductors 31 and 35.

While the two pairs of control windings are in circuit with a common D.C. power source, they are each individually controlled. As shown, the two rheostats form a gang-type unit so that as one rheostat increases resistance in its circuit, the other rheostat correspondingly reduces resistance in its circuit.

The function of the control windings, rheostats and D.C. power source is to controllably saturate outside legs 6 and 9 independently and separately of one another with D.C. flux and thereby regulate permeability of these two legs to flow of flux generated by the primary windings therethrough. By independent and separate control of the amount of flux flow through each outside leg, I govern the amount of output or secondary voltage of the transformer from 100% of secondary voltage down through 0 and up to 100% of secondary voltage 180° out of phase with the first-mentioned secondary voltage.

Figure 4:
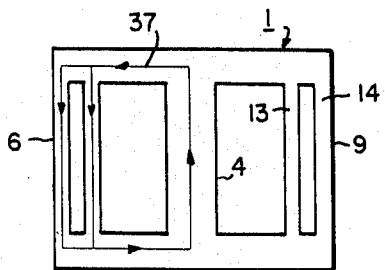
FIGURES 4–8 are schematic diagrams showing various excitation flux flow conditions in the transformer of FIGURE 1.

FIGURE 4 shows resultant flux flow 37 in the core 1 of FIGURE 1 when leg 6 is unsaturated and when leg 9 is fully saturated with D.C. flux generated by control windings 28 and 29. Under this condition, segments 13 and 14 have substantially zero permeability to passage of alternating flux. Accordingly, flux flow from primary winding 17 is at a minimum and flux flow from primary winding 16 is at a maximum, thereby producing the resultant flux flow 37 which effects a maximum flux coupling with the primary winding 16 and the secondary winding 22. This, in turn, induces maximum or full output voltage in the secondary winding 22.

Figure 5:
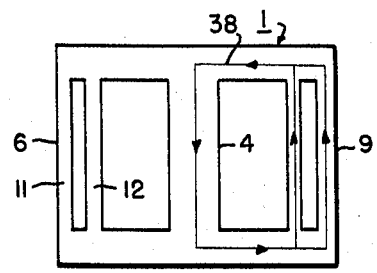

FIGURE 5 shows resultant flux flow 38 in the core 1 of FIGURE 1 when outside leg 9 is unsaturated and outside leg 6 is fully saturated so that segments 11 and 12 of leg 6 have substantially zero permeability to passage of alternating flux. Thus, flux flow from primary winding 16 is at a minimum and flux flow from primary winding 17 is at a maximum, thereby providing the resultant flux flow 38 wherein there is a maximum flux coupling between primary winding 17 and the secondary winding 22. Under this condition, maximum or full output voltage is induced in the secondary winding but with the phase of the induced voltage 180° from the induced voltage generated by the resultant flux flow 37 of FIGURE 4.

As saturation with D.C. flux is lowered in one outside leg and compensatingly increased in the other outside leg, from the conditions illustrated in FIGURES 4 and 5, the resultant flux-flow in the center leg will be lowered until it is zero, at which time each outside leg is 50% saturated. Under this condition, the induced secondary voltage is zero and the resultant flux flow 39 in the core 1 of FIGURE 1 is shown in FIGURE 6.

Figure 6:
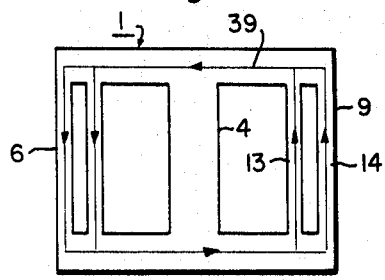

When a load is applied to the secondary circuit in any one of the conditions of FIGURES 4–6, inclusive, or in any intermediate condition, the secondary flux is opposed by the primary flux as in a conventional transformer but in relation to the amount of flux linking the primary and secondary windings so that when 50% of resultant flux couples the primary and second windings and the voltage of the secondary winding is 50% of applied primary voltage, then the secondary load current is effectively compensated by a primary load current one half the value of the secondary load current, and therefore, the power transfer between the primary and secondary circuits is equal.

Figure 7:
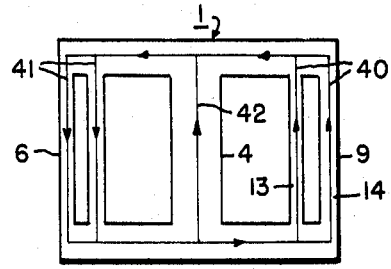

Considering an intermediate condition between those of FIGURES 4, 5 and 6, and referring to FIGURE 7, leg 9 is 75% saturated so that flux flow 40 therethrough is 33⅓% of total alternating flux in the core and 25% of applied voltage, and leg 6 is 25% saturated so that flux flow 41 therethrough is 100% of the total alternating flux flow in the core and 75% of applied voltage. In this condition, resultant flux flow 42 in the center leg is 66⅔% of total alternating flux and secondary voltage is 50% of applied voltage.

Assuming that there are 100 turns on each of the two primary windings 16 and 17 and on the secondary winding 22, and a 1 ampere current in the secondary circuit, the secondary load flux, since it is acting upon 50% of total core iron, is equal to 50% × 100 turns × 1 ampere or 50 net effective ampere turns of flux.

A consideration of the two primary windings shows the following:

100 turns × ½ ampere × 75% iron = 37½ ampere turns of effective primary load flux for primary winding 16.
100 turns × ½ ampere × 25% iron = 12½ ampere turns of effective primary load flux for primary winding 17.
37½ ampere turns of effective primary load flux + 12½ ampere turns of effective primary load flux = 50 ampere turns of effective primary load flux which is the output of the transformer under the previously described condition.

The foregoing condition satisfies equal power transfer between the primary and the secondary circuit in that 1 ampere × 50% voltage = ½ ampere × 100% voltage.

Of course, if outside leg 9 is 25% saturated instead of 75% and outside leg 6 is 75% saturated instead of 25%, the output voltage will be 50% of applied voltage but 180° out of phase with the abovedescribed condition.

Figure 8:
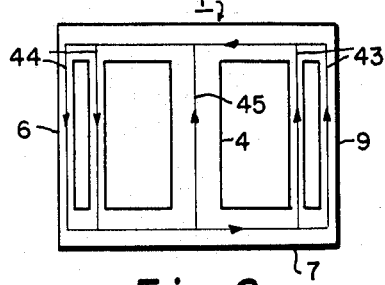

Referring to FIGURE 8, if a 20% output voltage is required, then leg 9 is 60% saturated so that flux flow 43 therethrough is 66⅔% of total alternating flux and 40% of applied voltage and leg 6 is 40% saturated so that flux flow 44 therethrough is 100% of total alternating flux and 60% of applied voltage to provide a resultant flux flow 45 of 33⅓% of total alternating flux in the center leg and an induced output voltage of 20% of applied voltage in the secondary circuit. In the event that output voltage must be 180° out of phase of the foregoing conditions, then the amount of saturation of the two outside legs is reversed. Thus, with the transformer of FIGURE 1, I interconnect and bring together the flux flows of the two transformers A and B to achieve the continuous and acccurate regulation of output voltage over the range set forth above in the case of the single coil secondary.

To compensate for A.C. wave form distortion caused by an A.C. unbalance in the control windings due to dissimilar magnetic structure, each of control windings 26 and 29 on segments 11 and 14 has a few more turns than the control windings 27 and 28.

Figure 9:
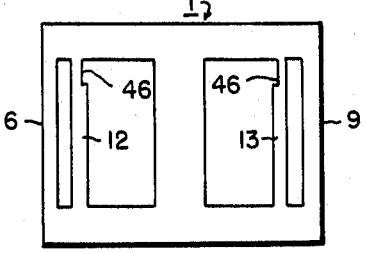
FIGURE 9 shows a modification of the core structure of the transformer of FIGURE 1.

An alternative for compensation of the A.C. wave form distortion is a reduction of the cross-sectional area of a part 46 of the length of segments 12 and 13 as shown in FIGURE 9. Thus, by either placing more turns on the outer segments 11 and 14 or by reducing the cross-sectional areas of a part of the length of inside segments 12 and 13, the outside legs 6 and 9 can be made magnetically equal to both D.C. and A.C. flux.

In circuit with each set of D.C. control windings is a capacitor for allowing a free flow of A.C. current between the control windings without going through the D.C. source. The capacitor has sufficient capacity to provide low impedance to the frequency of the circuit and avoid generating a resonant circuit with the inductances in the circuit. Across conductors 32 and 33 is a capacitor 90 and across conductors 32 and 35 is a capacitor 91.

Figure 2:
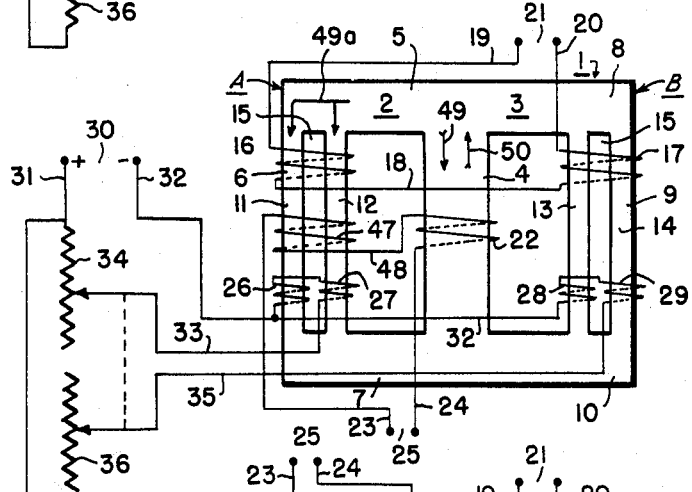
FIGURE 2 is a schematic diagram of a second embodiment of my transformer.

A second embodiment of my invention shown in FIGURE 2 uses the two transformers, the common magnetizable core, primary windings, control windings, rheostats, secondary windings, and conductors of the embodiment of FIGURE 1 and adds thereto a second secondary winding 47 disposed on outside leg 6 and connected in series with the first-mentioned secondary winding 22 by conductor 48. While the second secondary winding 47 is on outside leg 6, it, of course, may also be placed on the other outside leg 9 or on legs 5, 7, 8 and 10. As shown, in FIGURE 2, each of the primary and secondary windings has an equal number of turns.

The series connection of the two secondary windings is such that when resultant flux flow in the center leg is in the direction of arrow 49 and in the same direction as shown by arrows 49a in the outside leg 6 on which the second secondary winding 47 is wound, the induced voltages are series aiding. Correspondingly, when the resultant flux flow is in the direction of arrow 50 in the center leg and flux flow in the leg 6 is in the direction shown by arrows 49a, the induced voltages are series opposing.

Figure 10:
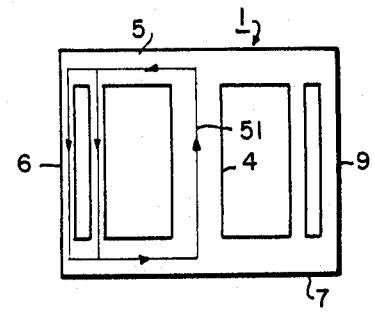
FIGURES 10–13 are schematic diagrams showing various excitation flux flow conditions in the transformer of FIGURE 2.

Referring to FIGURE 10 and considering the embodiment of FIGURE 2, when leg 9 is fully saturated and leg 6 is unsaturated, the resultant flux flow 51 which is the total alternating flux flow is through legs 5, 6 and 7 and center leg 4. However, as pointed out, the two secondary windings 22 and 47 in this condition are series opposing and equal voltages are induced in each so that net output voltage is zero.

Figure 11:
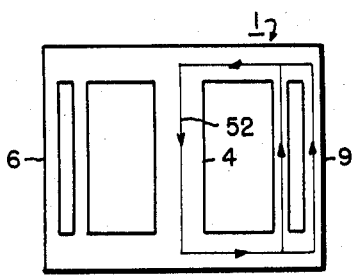

On the other hand, if leg 6 of the embodiment of FIGURE 2 is fully saturated and leg 9 is unsaturated, resultant flux flow 52 (FIGURE 11) through the center leg 4 is reversed. Accordingly, the total alternating flux generated by the primary winding 17 flows through the center leg 4 and maximum or full output voltage is induced because only the primary winding 17 is effective since there is no substantial alternating flux flow in leg 6, thereby inducing no substantial voltage in the secondary winding 47.

Figure 12:
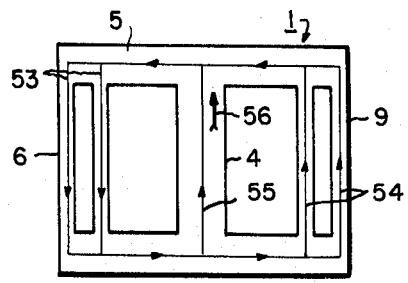

Further considering the embodiment of FIGURE 2, if outside legs 6 and 9 are unsaturated or saturated 50% each, no flux flows in the center leg 4 and only the secondary winding 47 is effective while both primary windings are effective, thus inducing an output voltage of one half of applied voltage. It follows that by regulating the amount of saturation of D.C. flux in the legs 6 and 9, a continuous controlled output voltage from about 2% to about 100% of applied voltage is achieved by the transformer of FIGURE 2. For example, considering FIGURE 12 and the transformer of FIGURE 2, when leg 6 is saturated 25% to produce 100 of total alternating flux flow 53 and 75% of applied voltage and leg 9 is saturated 75% to produce 33⅓% of total alternating flux flow 54 and 25% of applied voltage, the resultant flux flow 55 in the center leg 4 is 66⅔% of total flux and in the direction indicated by arrow 56. In this condition, due to the direction of flux flow in the center leg 4 and in outside leg 6, voltages induced in the two secondary windings 22 and 47 are series opposing and the net flux which induces an output voltage is 33⅓% of total flux, i.e., the difference between 100% flux of leg 6 and 66⅔% of resultant flux in the center leg 4, so that output voltage is 25% of applied voltage.

The foregoing condition satisfies the requirement for equal power transfer between primary and secondary circuits. Specifically, with a 1 ampere current in the secondary circuit and 100 turns on each primary and each secondary winding, the secondary load flux is 25 net effective ampere turns of flux resulting from 100 turns×1 ampere×75% iron in leg 6 from which is subtracted 100 turns×1 ampere×50% iron in center leg 4. Now, considering the primary circuit and outside leg 6, 100 turns×¼ ampere×75% iron equals 18¾ ampere turns of effective primary load flux, and, considering the other outside leg 9, 100 turns×¼ ampere×25% iron equals 6¼ ampere turns of effective primary load flux with the total effective primary load flux for the two legs 6 and 9 being 25 ampere turns of effective primary load flux.

Figure 13:
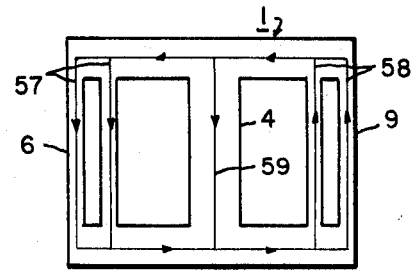

Further considering the embodiment of FIGURE 2 and particularly FIGURE 13, when outside leg 6 is 75% saturated and provides 33⅓% of total alternating flux flow 57 and 25% of applied voltage and when the other outside leg 9 is 25% saturated and produces 100% of total alternating flux flow 58 and 75% of applied voltage, output voltage is 75% of applied voltage. Under this condition, resultant flux flow 59 in the center leg is 66⅔% of total flux flow but is opposite to resultant flux flow 55 of FIGURE 12 and the induced voltages in the secondary windings are thereby connected series aiding so that 66⅔% flux is effective on the center leg and 33⅓% flux is effective on the outside leg 6 and the two added together induce an output voltage of 75% of applied voltage in the secondary circuit.

The transformer apparatus of FIGURE 2 provides a closer coupling of the primary and secondary windings on leg 6 than that of the transformer of FIGURE 1 and thereby enjoys greater efficiencies at lower output voltages.

Figure 3:
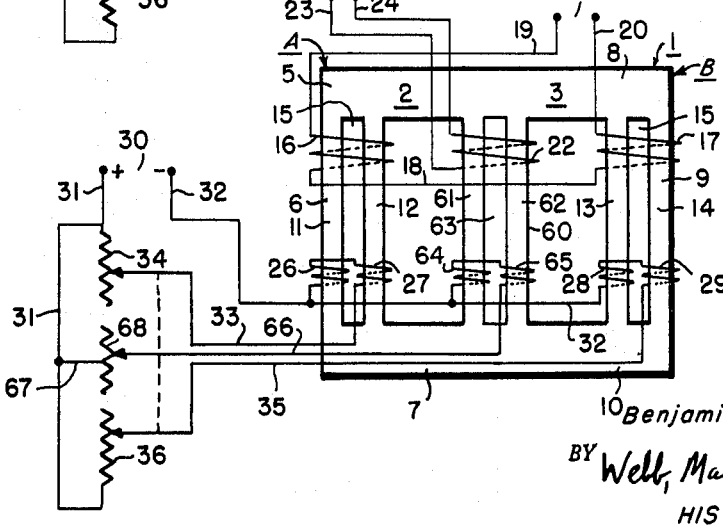
FIGURE 3 is a schematic diagram of a third embodiment of my transformer.

FIGURE 3 shows a third embodiment of my invention wherein the outside legs 6 and 9, primary windings, secondary windings, conductors 19, 20, 23, 24, 31, 32, 33 and 35, control windings, rheostats, and the magnetizable core except for the center leg are the same as those of the embodiment of FIGURE 1.

As to the center leg 60 of the transformer of FIGURE 3, it is the same as the outside legs 6 and 9 with two parallel segments 61 and 62 spaced apart by an air gap 63 and with a third pair of control windings 64 and 65 disposed thereon in the same way as the control windings 26 and 27 and 28 and 29. The control windings 64 and 65 are connected by conductors 32, 66, 67 and 31 to the D.C. power source 30 and there is a third rheostat 68 in circuit with the conductors 31, 67 and 66 for regulating the amount of D.C. current delivered to the third control winding. The three rheostats 34, 36 and 68 form a gang-type unit as shown in FIGURE 3. Like the other control windings, the third pair is individually controlled and has ability to controllably saturate the center leg from unsaturated to fully saturated condition. Of course, the third pair of control windings may be separate and independent electrically from the other control windings.

Use of the third control winding on the center leg of the transformer apparatus of FIGURE 3 overcomes secondary load distortion and is particularly desirable where some components or elements in the secondary circuit require a uniform voltage wave free from distortion.

Figure 14:
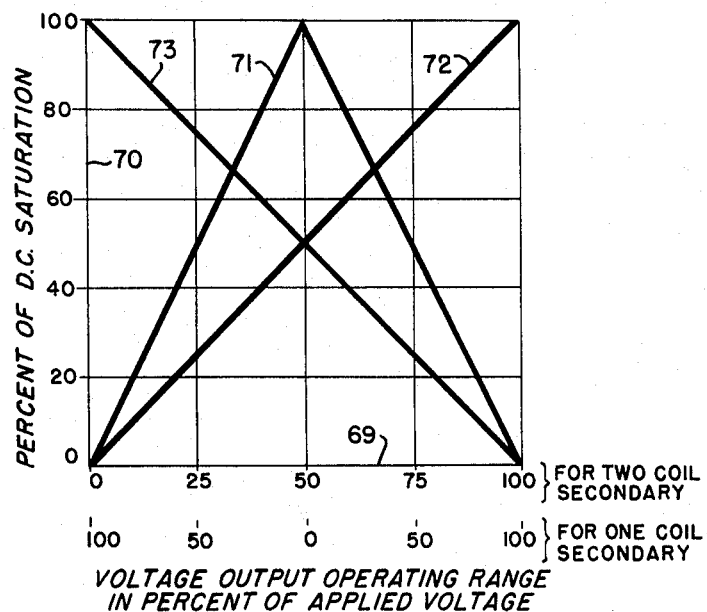
FIGURE 14 is a graph showing amounts of saturation of the center leg of the embodiment of FIGURE 3 relative to amounts of saturation of the two outside legs.

FIGURE 14 shows a graph which indicates the amount of D.C. saturation of the center leg 60 of the transformer apparatus of FIGURE 3 for various amounts of D.C. saturation in the outside legs 6 and 9 and for various output voltages shown in percentage of applied voltage. The abscissa 69 of the graph is voltage output operating range shown in percent of applied voltage with two ranges, i.e., one for a single coil secondary and one for a two coil secondary. The ordinate 70 is the percent of D.C. saturation for the center leg and the two outside legs. Curve 71 represents the amount of D.C. saturation for the center leg 60, curve 72 the amount of D.C. saturation for outside leg 6, and curve 73 the amount of D.C. saturation for outside leg 9. Considering the graph, when one outside leg is fully saturated and the other is unsaturated, then the center leg is unsaturated. When each outside leg is 50% saturated, the center leg is 100% saturated and when one outside leg is 75% saturated and the other 25% saturated, the center leg is 50% saturated. When one outside leg is 90% saturated and the other 10% saturated, the center leg is 20% saturated. Thus, by use of the graph, one may readily determine the amount of D.C. saturation for the center leg when the outside legs have a varying degree of D.C. saturation.

Referring to the transformer apparatus of FIGURE 1 and to leg 9 with its two segments 13 and 14 and control windings 28 and 29, for an instantaneous condition and considering the flux flow condition of FIGURE 7, leg 13 is more susceptible to A.C. excitation flux depending upon the direction and amount of D.C. flux saturation. Accordingly, as leg 13 receives more flux, the A.C. voltage induced in its coil becomes greater than the voltage induced in the coil of leg 14 and coil 28 acts as a primary winding relative to coil 29. Thus, a current is sent through winding 29 acting as a secondary to create a flux in leg 14 having a tendency towards balancing the A.C. excitation flux condition. However, a balance cannot be achieved for then there would not be the excess flux to generate the higher voltage which tries to effect a balanced condition. Therefore, A.C. excitation flux flows in both segments with slightly more flux flow in one than in the other to satisfy the unbalanced condition described above.

Since energy for this transfer of flux in the unbalanced condition must necessarily come from the A.C. power source 21 and since demand therefor comes from the leg 9, the primary windings 16 and 17 then treat or regard the control windings 28 and 29 as a single secondary winding. Now, if the transformer apparatus of FIGURE 1 had a single set of control windings such as 28 and 29 and not two sets of control windings, application of a D.C. current in the control windings to produce D.C. flux would cause a voltage drop and a distortion of voltage wave form in the secondary circuit.

Use of two sets of D.C. control windings, such as windings 26 and 27 on leg 6 and windings 28 and 29 on leg 9 correct the unbalanced condition when both legs 6 and 9 have equal amounts of or no D.C. excitation. Thus, with equal amounts of D.C. saturation in each of legs 6 and 9, both sets of control windings, each acting as a secondary, pull equal loads or currents from the primary windings 16 and 17 and thereby produce no voltage drop or voltage wave form distortion in the secondary circuit. Of course, when there is no D.C. excitation in the legs, the unbalanced condition is not present.

Where, however, there is a departure from no excitation or equal excitation in each of legs 6 and 9 and one of legs 6 or 9 is saturated a greater amount than the other, then that set of control windings on the leg with the greater amount of saturation requires more secondary current than the other set of control windings. Accordingly, voltage drop and voltage wave form distortion occur as a result of unbalanced or different amounts of A.C. flux in the D.C. control windings, with the amounts of drop and distortion increasing as the amount of saturation difference between the two legs increases. This unbalanced condition causes a reactive current to flow for which a second reactive current is required to effect correction therefor.

The set of D.C. control windings which saturates its two segment leg a greater amount than the other set of D.C. control windings brings about the voltage drop and wave distortion and the unbalanced condition by production of a lagging current flow. To correct or compensate for this unbalanced condition and to overcome the voltage drop and voltage wave form distortion, I provide the transformer apparatus with an operating means for each of the two segment legs which have a set of D.C. control windings. In one embodiment the operating means supplies a lagging current flow for that part of the core structure with a lesser amount of unidirectional current saturation in the two segment legs thereof equal to the excess current drawn by the set of D.C. control windings on the two segment leg wtih a lower voltage, i.e., the leg with the greater amount of D.C. saturation, over the current drawn by the set of D.C. control windings on the leg with the lesser amount of D.C. saturation. A second embodiment of the means supplies a leading current flow for that part of the core with a greater amount of unidirectional current saturation in the two segment leg thereof to effectively nullify or cancel the lagging current flow which produces the voltage drop and wave form distortion.

Figure 15:
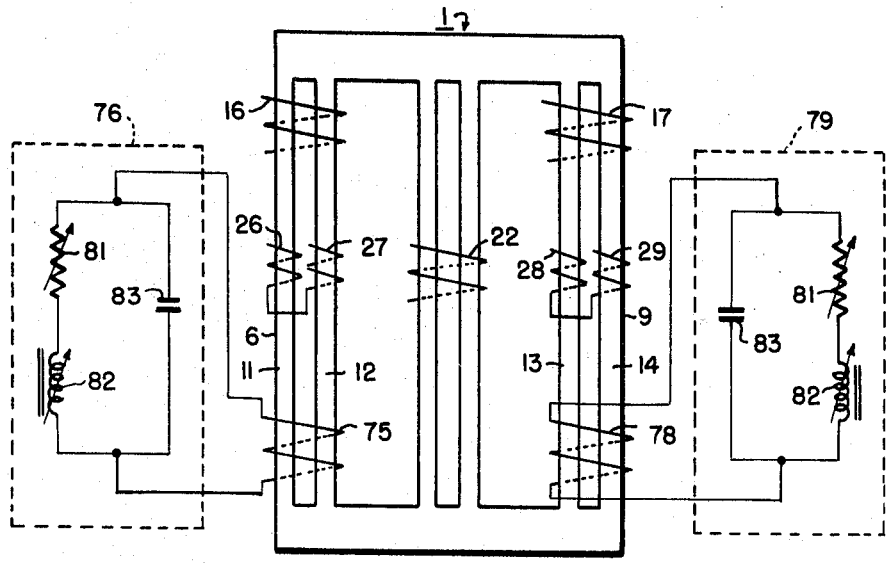
FIGURE 15 is a schematic diagram of the transformer of FIGURE 1 equipped with one example of apparatus which effects correction of voltage drop and distortion of wave form in the secondary circuit as a result of unequal amounts of D.C. flux in the two parts.

FIGURE 15 shows the transformer apparatus of FIGURE 1 provided with one example of the operating means which supplies the lagging current flow, namely, an A.C. control winding electrically separate and independent from the D.C. set of control windings for each of legs 6 and 9. The A.C. control winding is connected to a variable impedance network. Specifically, leg 6 has an A.C. control winding 75 embracing both segments 11 and 12 and connected to a variable impedance network 76. Leg 9 also has an A.C. control winding 78 embracing both segments 13 and 14 and connected to another variable impedance network 79.

As shown, each network has in circuit with its control winding a variable resistance 81 and a variable inductance 82 in parallel with a capacitance 83.

Figure 16:
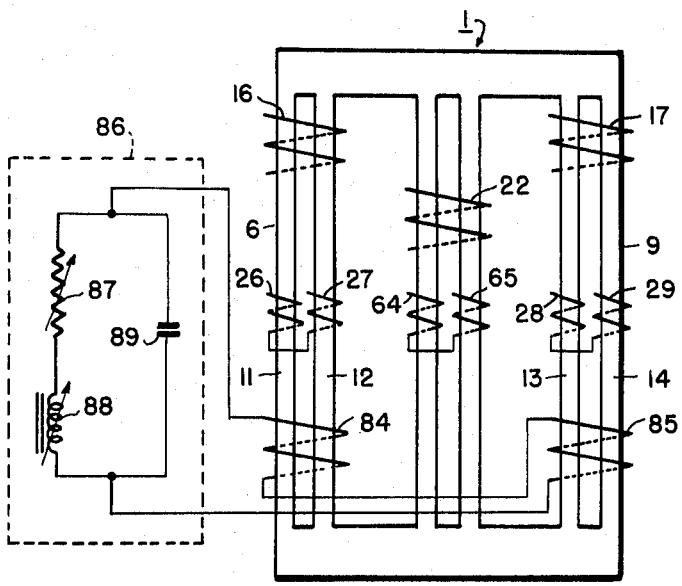
FIGURE 16 is a schematic diagram of the transformer of FIGURE 3 equipped with a second example of the apparatus for correction of voltage drop and distortion of wave form.

FIGURE 16 shows the transformer apparatus of FIGURE 3 provided with a second example of the operating means which produces the lagging current flow and which comprises an A.C. control winding 84 embracing both segments 11 and 12 of leg 6 and an A.C. control winding 85 embracing both segments 13 and 14 of leg 9. The two A.C. control windings 84 and 85 are connected series opposing and are in circuit with a variable impedance network 86 which has a variable resistance 87 and a variable inductance 88 in parallel with a capacitance 89.

Figure 25:
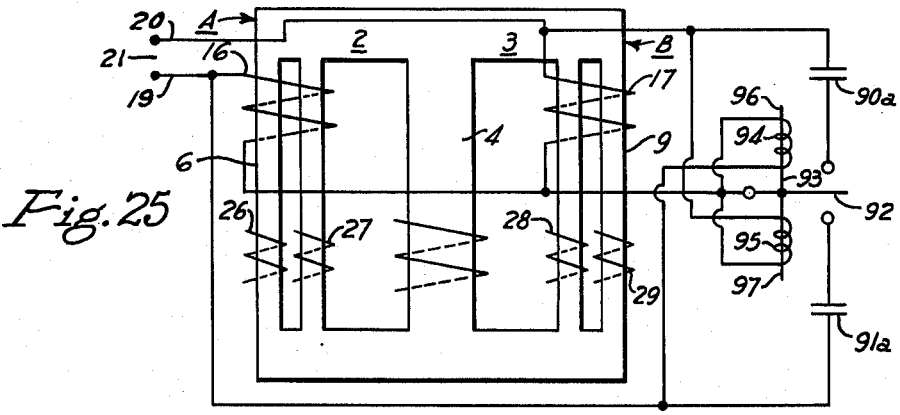
FIGURE 25 is a schematic diagram showing a third example of the apparatus which corrects voltage drop and distortion of wave form.

FIGURE 25 shows a third example of the operating means which uses the primary windings 16 and 17 instead of the A.C. control windings 75 and 76 and which has two capacitors 90a and 91a and a single pole, double-throw switch 92. Since the set of D.C. control windings, which saturates its two-segment leg a greater amount than the other set of D.C. control windings, produces the voltage drop and wave form distortion by a lagging current flow, a capacitor corrects or compensates for the distortion by providing a leading current flow. Accordingly, the two capacitors 90a and 91a effect the same results as the variable impedance networks.

The switch 92 is also a no-voltage, return-to-neutral type relay and includes a movable magnetizable core 93 wtih coils 94 and 95 at ends 96 and 97 of the core. Coil 94 is connected to primary winding 16 and coil 95 to primary winding 17 so that when the two segment leg 9 has a greater amount of D.C. saturation than two segment leg 6, primary winding 16 has a higher voltage than primary winding 17 and thereby operates the switch 92 to place the capacitor 90a in circuit with the primary winding 17. Conversely, the capacitor 91a is placed in circuit with the primary winding 16 when the two segment leg 6 is more saturated with D.C. flux than the other two segment leg 9 by operation of the switch 92 as a result of greater voltage in the primary winding 17.

A fourth example of the operating means (FIGURE 26) uses the single network 86 connected to the two primary windings 16 and 17 through a switch arrangement 98 comprising a single pole, double-throw switch 99, the same as switch 92, and two single pole, single-throw switches 100 and 101. The switches 99 and 100 are connected by lines 102, 103 and 104 to the primary winding 17 so that when the two segment leg 6 has more D.C. flux saturation than leg 9, the greater voltage in the primary winding 17 actuates the switches 99 and 100 to place the network 86 in circuit with the primary winding 17. The network 86 is similarly placed in circuit with the other primary winding 16 when the two segment leg 9 has more D.C. flux saturation than leg 6 through operation of switches 99 and 101 connected to the winding 16 by lines 102, 105 and 106.

Figure 27:
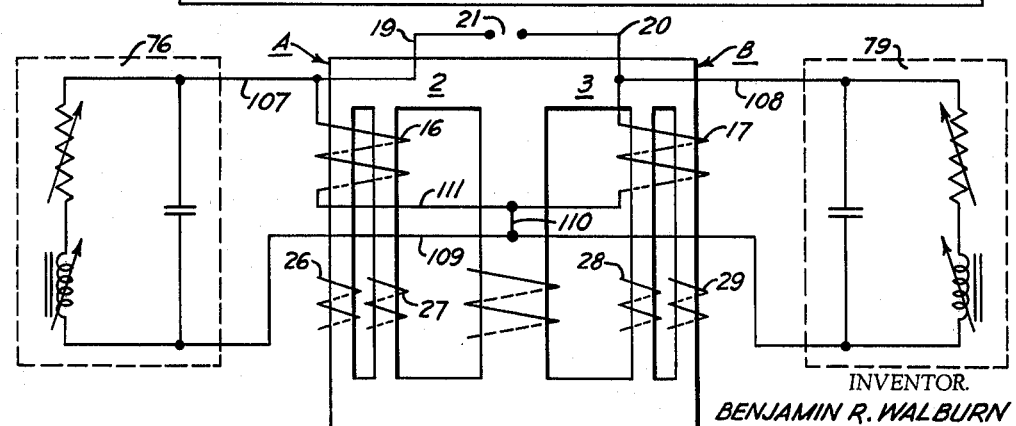
FIGURE 27 is a schematic diagram of a fifth example of the apparatus which corrects voltage drop and distortion of wave form.

In a fifth example of the operating means (FIGURE 27) the two networks 76 and 79 are connected to the two primary windings 16 and 17 by line 107 which runs from winding 16 to network 76 and by line 108 from primary winding 17 to network 79. A conductor 109 joins the networks 76 and 79 in series and a conductor 110 has an electrical connection between conductor 109 and line 111 which connects the two primary windings. In this example, no switch is used but the networks work harder than those where a switch such as switch 92 of FIGURE 25 is employed.

Figure 26:
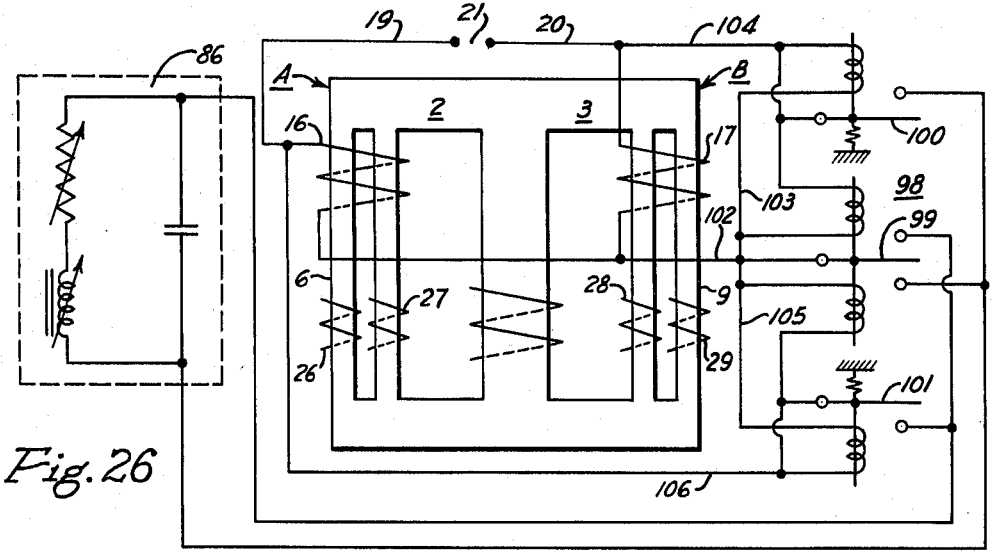
FIGURE 26 is a schematic diagram of a fourth example of the apparatus which corrects voltage drop and distortion of wave form.

A single capacitor also effects correction for the voltage drop and wave form distortion when connected into the switch arrangement of FIGURE 26 which is then modified so that the capacitor is in circuit with that primary winding whose D.C. control winding has saturated its two segment leg with D.C. flux a greater amount than the other two segment leg has been saturated with D.C. flux.

Figure 17:
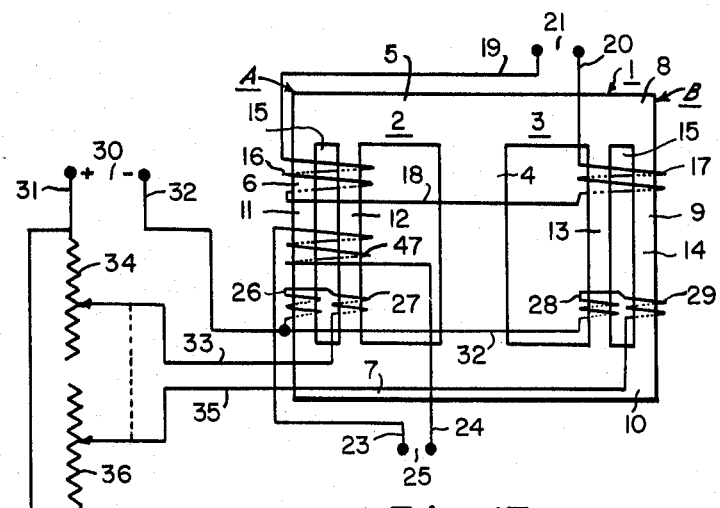
FIGURE 17 is a schematic diagram showing a fourth embodiment of my transformer.

FIGURE 17 discloses a fourth embodiment of my invention wherein a single secondary alternating current winding 47 is on the outside leg 6. Otherwise, the transformer apparatus of FIGURE 17 is the same as the transformer apparatus of FIGURE 1. While the secondary winding 47 is on the outside leg 6, it may also be placed on the other outside leg 9 or on legs 5, 7, 8 and 10. To this fourth embodiment can be added the operating means for each of legs 6 and 9 described herein and examples of which are shown by FIGURES 15, 16, 25, 26 and 27, and which include A.C. control windings 75 and 78 or 84 and 85 and variable impedance networks 76 and 79 or 86 and capacitors 90a and 91a. Also, a few more turns may be used for each of control windings 26 and 29 or a reduction in the cross-sectional area of a part 46 of the length of segments 12 and 13.

The transformer apparatus of FIGURE 17 provides a substantially constant output voltage under load from 100% of secondary voltage down to about 50% of secondary voltage but below 50% of secondary voltage, a voltage drop and a distortion of wave form occur. Thus, this transformer has utility for dimming of lights where in most cases 50% voltage extinguishes the lights and for electric resistance heaters whose power is proportional to the square of the voltage so that at 50% voltage, power output or heat is about 25%.

Figure 18:
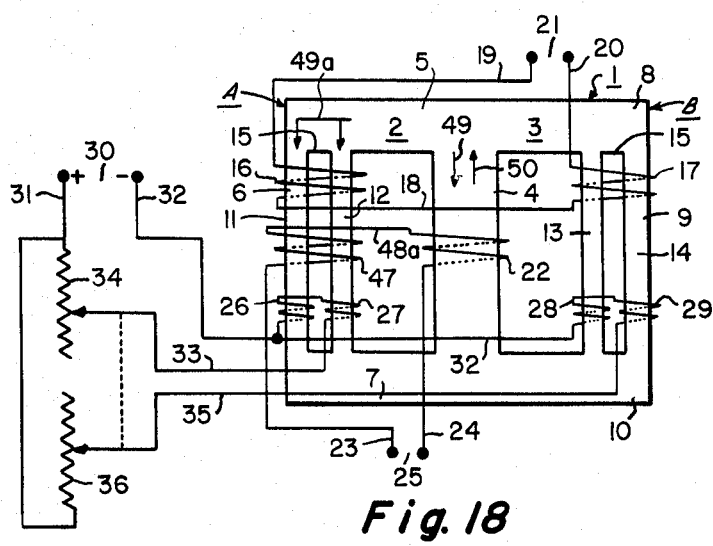
FIGURE 18 is a schematic diagram showing a fifth embodiment of my transformer.

A fifth embodiment, the transformer apparatus of FIGURE 18, is the same as the transformer apparatus of FIGURE 2 except that the conductor 48 which, in FIGURE 2, runs from the bottom of winding 47 across the front side of leg 6 and up to the top of winding 22 where it connects to a turn thereof extending across the front side of the center leg 4, has been eliminated and the conductor 23 is joined to the bottom of winding 47 instead of to its top. A conductor 48a connects the secondary windings 22 and 47 in series and runs from its junction with the top of the winding 47 across the front side of leg 6 to its junction with the top of winding 22 on the front side of the center leg 4.

The series connection of the two secondary windings of the transformer apparatus of FIGURE 18 is such that when resultant flux flow in the center leg is in the direction of arrow 49 and in the same direction as shown by arrows 49a in the outside leg 6 on which the second secondary winding 47 is wound, the induced voltages are series opposing. Correspondingly, when the resultant flux flow is in the direction of arrow 50 in the center leg and flux flow in the leg 6 is in the direction shown by arrows 49a, the induced voltage are series aiding.

To this fifth embodiment can be added the operating means for each of legs 6 and 9 described herein and examples of which are shown by FIGURES 15, 16, 25, 26 and 27, and which include A.C. control windings 75 and 78 or 84 and 85 and variable impedance networks 76 and 79 or 86 and the capacitors 90a and 91a. Also, the two segment center leg 60 of FIGURE 3 and its unidirectional current windings 64 and 65 have utility in this fifth embodiment as well as the few more turns for each control winding 26 and 29 or the reduction in the cross-sectional area of the part 46 of the length of segments 12 and 13.

The transformer apparatus of FIGURE 18 furnishes a substantially constant output voltage under load over a range from 100% of secondary voltage down through zero and up to 200% of secondary voltage which is 180° out of phase with the first-mentioned secondary voltage.

Figure 19:
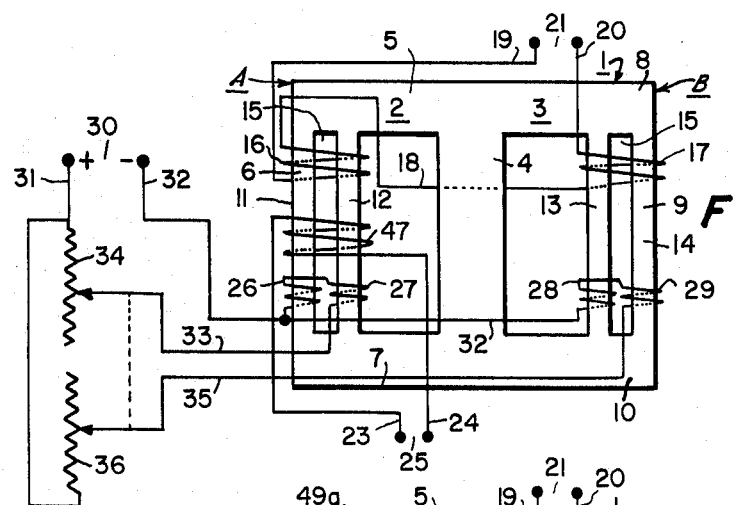
FIGURE 19 is a schematic diagram showing a sixth embodiment of my transformer.

FIGURE 19 shows a sixth embodiment of my invention which is the same as the transformer apparatus of FIGURE 17 except that the two primary windings 16 and 17 are connected series opposing. While the secondary winding 47 is on the outside leg 6, it may also be placed on the other outside leg 9 or on legs 5, 7, 8 and 10. Also, to this embodiment can be added the operating means for each of legs 6 and 9 described herein and examples of which are shown by FIGURES 15, 16, 25, 26 and 27, and which include alternating current control windings 75 and 78 or 84 and 85 and the variable impedance networks 76 and 79 or 86 and the capacitors 90a and 91a.

The transformer apparatus of FIGURE 19 provides a substantially constant output voltage under load over a range from about 0–100% of secondary voltage.

Figure 20:
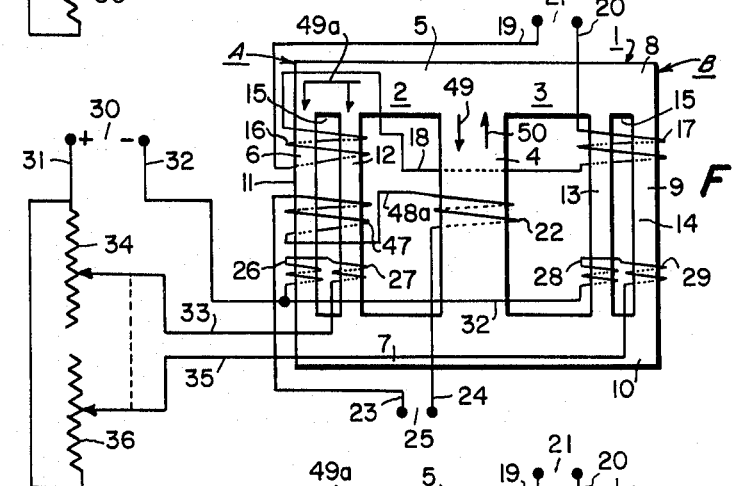
FIGURE 20 is a schematic diagram showing a seventh embodiment of my transformer.

FIGURE 20 discloses a seventh embodiment of my invention which is the same as the transformer apparatus of FIGURE 18 except that the two primary windings are connected series opposing. In this seventh embodiment, the two secondary windings 22 and 47 are joined series opposing. To this transformer can be added the operating means for each of legs 6 and 9 described herein and examples of which are shown by FIGURES 15, 16, 25, 26 and 27 and which include the alternating current control windings 75 and 78 or 84 and 85 and the variable impedance networks 76 and 79 or 86 and the capacitors 90a and 91a. Additionally, the two segment center leg 60 of FIGURE 3 and its unidirectional current windings 64 and 65 have application to this transformer.

The transformer apparatus of FIGURE 20 generates a substantially constant output voltage under load for a range from about 0–100% of secondary voltage.

Figure 21:
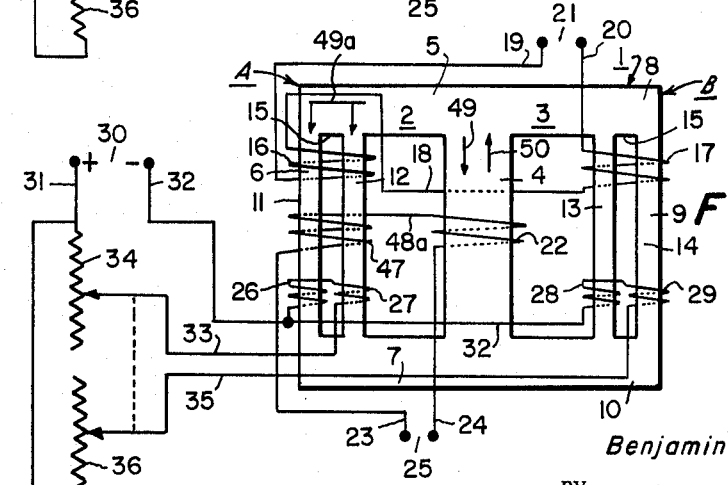
FIGURE 21 is a schematic diagram showing an eighth embodiment of my transformer.

FIGURE 21 shows an eighth embodiment of my invention which is the same as the transformer apparatus of FIGURE 20 except that the two secondary windings are connected series aiding. Also, to this embodiment can be added the operating means for each of legs 6 and 9 described herein and examples of which are shown by FIGURES 15, 16, 25, 26 and 27, and which include A.C. current control windings 75 and 78 or 84 and 85 and variable impedance networks 76 and 79 or 86 and the capacitors 90a and 91a. Additionally, the two segment center leg 60 of FIGURE 3 and its unidirectional current windings 64 and 65 have utility on this transformer.

The transformer apparatus of FIGURE 21 produces a substantially constant output voltage under load over a range from about 100%–200% of secondary voltage.

FIGURE 22 illustrates a ninth embodiment of my invention which is the same as the transformer apparatus of FIGURE 18 except that the two secondary windings 22 and 47 are connected series opposing and the secondary winding 22 is on the outside leg 9 instead of on the center leg 4. To this transformer apparatus can be added the operating means for each of legs 6 and 9 described herein and examples of which are shown by FIGURES 15, 16, 25, 26 and 27, and which include the alternating current control windings 75 and 78 or 84 and 85 and the variable impedance networks 76 and 79 or 86 and the capacitors 90a and 91a. Additionally, the two segment center leg 60 of FIGURE 3 and its unidirectional current windings 64 and 65 have application to this transformer.

The transformer apparatus of FIGURE 22 provides a substantially constant output voltage under load over a range from 100% of secondary voltage down through zero and up to 100% of secondary voltage 180° out of phase with the first-mentioned secondary voltage.

FIGURE 23 discloses a tenth embodiment of my invention which is the same as the transformer apparatus of FIGURE 22 except that the two primary windings are connected series opposing. To this transformer apparatus can be added the operating means for each of legs 6 and 9 described herein and examples of which are shown by FIGURES 15, 16, 25, 26 and 27, and which include the alternating current control windings 75 and 78 or 84 and 85 and the variable impedance networks 76 and 79 or 86 and the capacitors 90a and 91a. Additionally, the two segment center leg 60 of FIGURE 3 and its unidirectional current windings 64 and 65 have application to this transformer.

The transformer apparatus of FIGURE 23 provides substantially constant output voltage under load over a range from 100% of secondary voltage down through zero and up to 100% of secondary voltage 180° out of phase with the first-mentioned secondary voltage.

FIGURE 24 shows an eleventh embodiment of my invention which is the same as the transformer apparatus of FIGURE 22 as to the core 1, the two primary windings 16 and 17 connected series aiding and the control windings 26, 27, 28 and 29. Regarding the secondary windings, this eleventh embodiment uses three 112, 113 and 114 connected in series with 112 disposed on the outside leg 6, 113 disposed on the center leg 4 and 114 disposed on the other outside leg 9.

The series connection of these three secondary coils has the center winding 113 on the center leg 4 joined series aiding to each of the other two windings 112 and 114 on the outside legs 6 and 9, respectively. Such a series connection places the center winding in series opposing relationship with that secondary winding on that outside leg which has the greater amount of direct current flux saturation generated by the control windings and in series aiding relationship with the other secondary winding. This occurs regardless of the phase of the output voltage.

Referring to FIGURE 24, with an instantaneous excitation flux flowing counterclockwise as shown by arrow 115 and with winding 112 cut out due to full saturation of its leg 6 by the control windings 26 and 27, terminal 116 of winding 113 and terminal 117 of winding 114 are positive and full output voltage results at the output terminal 118 of winding 112. Additionally, with the same instantaneous condition of excitation flux but with leg 9 fully saturated with direct current flux by control windings 28 and 29, terminal 119 of winding 112 and terminal 120 of winding 113 are positive and windings 112 and 113 are in an aiding relationship, thereby providing full output voltage at terminal 121 of winding 114. Accordingly, full output voltage is available from this eleventh embodiment upon a 180° phase reversal.

When legs 6 and 9 are each 50% saturated with direct current flux, there is zero excitation flux in the center leg 4 and, therefore, a zero output voltage.

Inasmuch as the center leg winding is in series aiding relationship with one or the other of the outside leg windings under full voltage conditions, each of the secondary windings requires only one-half the number of turns of each primary winding to supply output voltage equal to input voltage. Thus, this transformer of FIGURE 24 uses only 50% more wire than a single full voltage secondary winding but has an advantage regarding flux couplings between primary and secondary windings wherein a secondary winding with one-half the number of turns of its primary winding is disposed on the same part of the core as the primary winding. This arrangement has an advantage that two of the secondary windings are disposed upon the same legs as the primaries thereby effecting less leakage of flux and higher efficiencies.

To this transformer apparatus can be added the operating means for each of legs 6 and 9 described herein and examples of which are shown by FIGURES 15, 16, 25, 26 and 27, and which include the alternating current control windings 75 and 78 or 84 and 85 and the variable impedance networks 76 and 79 or 86 and the capacitors 90a and 91a. Additionally, the two segment center leg 60 of FIGURE 3 and its unidirectional current windings 64 and 65 have application to this transformer. The direct current control winding on the center leg 4 in this eleventh embodiment serves the same function as in the other embodiments in that it is used for elimination of distortion caused by a secondary current flowing through its windings and impressed by another voltage source when its own voltage is less than maximum such as when it is used as a voltage regulator.

The transformer apparatus of FIGURE 24 provides a substantially constant output voltage under load over a range from 100% of secondary voltage down through zero and up to 100% of secondary voltage 180° out of phase with the first-mentioned secondary voltage.

Figure 28:
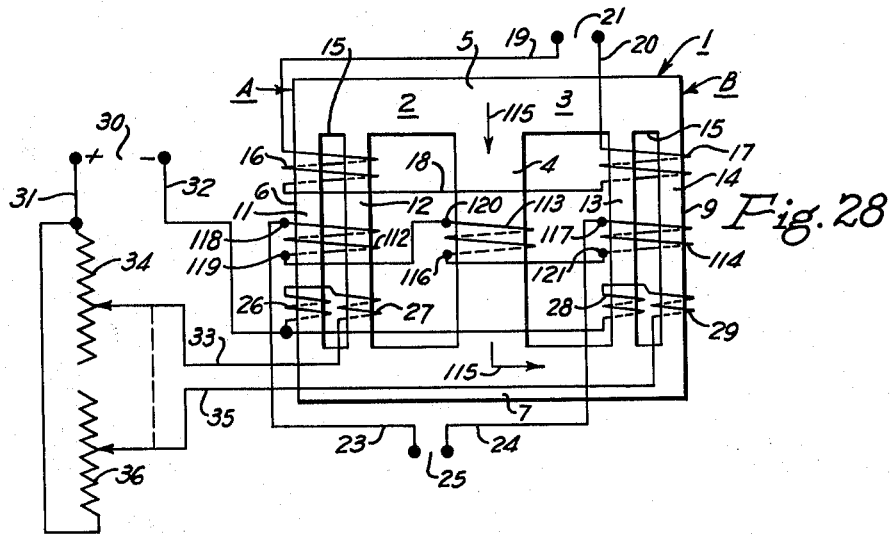
FIGURE 28 is a schematic diagram of a twelfth embodiment of my transformer.

FIGURE 28 shows a twelfth embodiment of my invention which is the same as the transformer apparatus of FIGURE 24 except that the secondary winding 113 on the center leg 4 is connected series aiding with the secondary winding 114 on leg 9 and is connected series opposing with the secondary winding 112 on the leg 6.

In this embodiment the secondary winding 113 on the center leg 4 opposes the secondary winding 114 on the leg 9 when the leg 9 has more D.C. saturation than the leg 6 and aids the secondary coil 112 on the leg 6 when the leg 6 has more D.C. saturation than the leg 9.

To the transformer apparatus of this embodiment can be added the operating means for each of legs 6 and 9 described herein and examples of which are shown by FIGURES 15, 16, 25, 26 and 27, and which include the alternating current control windings 75 and 78 or 84 and 85 and the variable impedance networks 76 and 79 or 86 and the capacitors 90a and 91a. Additionally, the two segment center leg 60 of FIGURE 3 and its unidirectional current windings 64 and 65 have application to this transformer.

The transformer apparatus of FIGURE 28 provides a substantially constant output voltage under load over a range from 0–100% of secondary voltage.

A modification (not shown) of the twelfth embodiment of my invention is the same as the transformer apparatus of FIGURE 28 except that the primary windings are connected series opposing.

In this modification the secondary winding 113 on the center leg 4 opposes the secondary winding 112 on the leg 6 and aids the secondary winding 114 on the leg 9. This modification provides a substantially constant output voltage under load over a range from 0–100% of secondary voltage.

Figure 29:
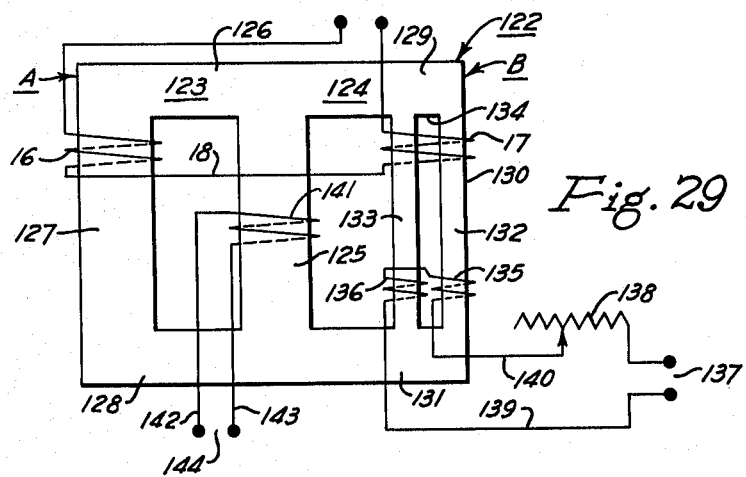
FIGURE 29 is a schematic diagram showing a thirteenth embodiment of my transformer which uses a single two segment leg upon which is a single set of unidirectional control windings.

FIGURE 29 shows a thirteenth embodiment of my invention comprising the two transformers A and B with their primary windings 16 and 17, respectively, disposed upon a common magnetizable core 122, connected series aiding and each able to withstand full applied voltage at normal designed flux density in its own magnetic circuit. The core 122 is similar to the core 1 except that it has a single two segment leg instead of a pair of two segment legs. Specifically, the core 122 comprises two parts 123 and 124 connected to a center leg 125. Part 123 has three legs 126, 127 and 128, and part 124 also has three legs 129, 130 and 131, with all the legs, including the center leg, interconnected magnetically. On the center leg 125 is a secondary alternating current winding 141 joined by conductors 142 and 143 to an A.C. load 144. This embodiment also has the two segment center leg 60 (not shown in FIGURE 29) of FIGURE 3 and the unidirectional control windings 64 and 65 (also not shown in FIGURE 29).

The leg 130 of the part 124 has two segments 132 and 133 disposed in parallel with an air space 134 therebetween. These two segments 132 and 133 are the same as the segments 11, 12, 13 and 14 of the core 1. On the segments 132 and 133 are control windings 135 and 136, respectively, connected series opposing and connected to a D.C. power source through a rheostat 138 by conductors 139 and 140. Thus, the control windings 135 and 136 controllably saturate the leg 130 with D.C. flux and thereby regulate the amount of A.C. flux flow therethrough to effect a given amount of output or secondary voltage through the secondary alternating current winding 141.

To the embodiment of FIGURE 29 can be added the operating means for the two segment leg 130, examples of which are a variable impedance network such as network 76, 79 or 86, or a capacitor such as capacitor 90a or 91a. Where the variable impedance network is used, it is connected to the primary winding 16, and where the capacitor is used, it is joined to the primary winding 17.

Inasmuch as the embodiment of FIGURE 29 has a single two segment leg and one set of D.C. control windings on one part of the core 122, its range of output voltage is less than those embodiments which have a pair of two segment legs with a set of D.C. control windings on each two segment leg of each part of the core. Specifically, this embodiment provides a substantially constant output voltage under load over a range from 0–100% of secondary voltage.

The core 122 with its single two segment leg 130 and single set of D.C. control windings 132 and 133 in combination with the two primary windings 16 and 17 and with the secondary winding and windings, the primary and secondary windings being connected and located as shown and described regarding the embodiment of FIGURES 1, 2, 17, 18, 19, 20, 21, 22, 23, 24, 28 and the modification of the twelfth embodiment, comprises variable voltage transformer apparatus of my invention. Of course, such single two segment leg and single set of D.C. control windings embodiments have in most cases a lower range of output or secondary voltage than the two pair two segment leg and two sets of D.C. control windings embodiments.

The operating means which corrects voltage drop and wave form distortion have application to the single two segment leg and single set of D.C. control windings embodiments as described in regard to the embodiment of FIGURE 29.

The embodiments of my invention comprising the core 122, the two primary windings 16 and 17 connected series aiding, and the D.C. control windings 132 and 133 on the two segment leg 130 provide substantially constant output voltage under load over a range from 0–50% of secondary voltage where there are two secondary windings connected series opposing and disposed one secondary winding on the center leg and the other secondary winding on either the two segment leg 130 or the leg 127.

The embodiment of my invention comprising the core 122, the two primary windings 16 and 17 connected series aiding, and the D.C. control windings 132 and 133 on the two segment leg 130 provide substantially constant output voltage under load over a range from 50–100% of secondary voltage where a single secondary winding is disposed on the leg 127. Where the single secondary winding is on the two segment leg 130, the embodiment provides substantially constant output voltage under load over a range from 0–50% of secondary voltage.

The embodiments of my invention comprising the core 122, the two primary windings 16 and 17 connected series aiding, and the D.C. control windings 132 and 133 on the two segment leg 130 provide substantially constant output voltage under load over a range from 200–100% of secondary voltage where there are two secondary windings connected series aiding and disposed one secondary winding on the center leg 125 and the other secondary winding on either the two segment leg 130 or the leg 127.

The embodiments of my invention comprising the core 122, the two primary windings 16 and 17 connected series opposing, and the D.C. control windings 132 and 133 on the two segment leg 130 provide substantially constant output voltage under load over a range from 0–50% of secondary voltage where there are two secondary windings connected series opposing and disposed one secondary winding on the center leg and the other secondary winding on either the two segment leg 130 or the leg 127.

The embodiment of my invention comprising the core 122, the two primary windings 16 and 17 connected series opposing, and the D.C. control windings 132 and 133 on the two segment leg 130 provides substantially constant output voltage under load over a range from 50–100% of secondary voltage where a single secondary winding is disposed on the leg 127. Where the single secondary winding is on the two segment leg 130, the embodiment provides substantially constant output voltage under load over a range from 0–50% of secondary voltage.

The embodiments of my invention comprising the core 122, the two primary windings 16 and 17 connected series opposing, and the D.C. control windings 132 and 133 on the two segment leg 130 provide substantially constant output voltage under load over a range from 150–200% of secondary voltage where there are two secondary windings connected series aiding and disposed one secondary winding on the center leg 125 and the other secondary winding on either the two segment leg 130 or the leg 127.

The embodiment of my invention comprising the core 122, the two primary windings 16 and 17 connected series aiding, and the D.C. control windings 132 and 133 on the two segment leg 130 provides substantially constant output voltage under load over a range from 0–100% of secondary voltage where there are three secondary windings all connected series aiding and as shown in FIGURE 24 and disposed one secondary winding on the center leg 125, one on the leg 127 and one on the two segment leg 130.

The embodiment of my invention comprising the two primary windings 16 and 17 connected series aiding and a modified core 122 in which leg 127 is the two segment one and has the D.C. control windings 132 and 133 and in which leg 130 is not two segment and has no D.C. control windings provides substantially constant output voltage under load over a range from 0–100% of secondary voltage where there are three secondary windings. Disposition of the secondary windings is one on the center leg 125, one on the two segment leg 127 with the D.C. control windings, and one on the leg 130. These three secondary windings are connected such that the one on the center leg is series opposing with the one on the two segment leg 127 and series aiding with the one on the leg 130.

The embodiment of my invention comprising the core 122, the two primary windings 16 and 17 connected either series aiding or series opposing, and the D.C. control windings 132 and 133 on the two segment leg 130 provides substantially constant output voltage under load over a range from 0–100% of secondary voltage where there are two secondary windings connected series opposing and disposed one on the leg 127 and the other on the two segment leg 130.

The embodiment of my invention comprising the core 122, the two primary windings 16 and 17 connected series opposing, and the D.C. control windings 132 and 133 on the two segment leg 130 provides substantially constant output voltage under load over a range from 0–50% of secondary voltage where there are three secondary windings disposed one on the center leg 125, one on the leg 127 and one on the two segment leg 130. Connection of these three secondary windings is such that the one on the center leg is series opposing with the one on the leg 127 and series aiding with the one on the two segment leg 130.

The embodiment of my invention comprising the two primary windings 16 and 17 connected series opposing and a modified core 122 in which leg 127 is the two segment one and has the D.C. control windings 132 and 133 and in which leg 130 is not two segment and has no D.C. control windings provides substantially constant output voltage under load over a range from 50–100% of secondary voltage where there are three secondary windings. Disposition of the three secondary windings is one on the center leg 125, one on the two segment leg 127 with the D.C. control windings, and one on the leg 130. These three secondary windings are connected such that the one on the center leg is series opposing with the one on the two segment leg 127 and series aiding with the one on the leg 130.

My invention has important advantages which render it highly desirable for A.C. power applications. In the first place, and of particular significance is that it provides constant output voltage under load over the ranges previously set forth for the single coil, double coil and triple coil secondaries.

In the second place, it uses a standard or conventional transformer structure and components and thereby may be readily manufactured without special apparatus and machinery.

In the third place, taps and special equipment for effecting voltage changes or control are eliminated.

In the fourth place, the core structure has no air gaps and the transformer has no rotating elements.

In the fifth place, the transformer enjoys high efficiency together with adaptability for either automatic or manual operation.

In the sixth place, maintenance costs are low.

In the seventh place, it has a fast, corrective response to voltage changes and can be built for any power or voltage range.

In the eighth place, it is not affected by power factor of a load and does not have any more adverse affect upon a system power factor than a conventional transformer.

In the ninth place, it can be used as a direct power control device for a load or as a percentage regulator for voltage stabilization and, in addition, can be used singly for single phase circuits or in banks of two or three for 2 or 3 phase circuits. Also, it can be used with stable dry-type rectifier elements to produce a variable source of direct current.

While I have described present preferred embodiments of my invention, it is to be understood that it may be otherwise embodied within the scope of the appended claims.

I claim:

1. Variable voltage transformer apparatus for providing substantially constant output voltage under load comprising first and second transformers each including a primary alternating current winding capable of withstanding full applied voltage, said two primary windings being disposed upon a common magnetizable core having two parts and a center leg, each of said parts having a leg comprising two segments disposed in parallel magnetically, said two primary windings being series connected and disposed with one winding on each of said two parts, three secondary alternating current windings connected in series and disposed one on said center leg and one on each of said two parts, at least one of said secondary windings on one of said two parts being connected series aiding with said secondary winding on said center leg, each two segment leg having a unidirectional current winding on each segment with said unidirectional current windings on said two segments of each leg being connected series opposing, said unidirectional windings on each of said two segment legs being connected to means for individually regulating the amount of unidirectional current flowing therethrough so that each two segment leg is adapted to be controllably saturated by its unidirectional current windings.

2. The transformer apparatus of claim 1 characterized by operating means in effective electrical disposition with one of each of said two parts of said core and of each of said primary windings for effecting correction of voltage drop and distortion of wave form in the secondary circuit caused by unequal amounts of unidirectional flux in said two segment legs.

3. The transformer apparatus of claim 1 characterized by said center leg comprising two segments disposed in parallel magnetically, a unidirectional current winding on each of said two segments, said unidirectional current windings being connected series opposing and connected to said means for individually regulating the amount of unidirectional current flowing therethrough to controllably saturate said center leg.

4. The transformer apparatus of claim 1 characterized by one of said segments of each of said legs comprising two segments having a few more turns of said unidirectional current winding than the other segment of its leg to overcome alternating current wave form distortion resulting from dissimilar magnetic structure.

5. The transformer apparatus of claim 1 characterized by one of said segments of each of said legs comprising two segments having a part with a different amount of cross-sectional area than the cross-sectional area of said other segment to overcome alternating current wave form distortion resulting from dissimilar magnetic structure.

6. The transformer apparatus of claim 2 characterized by said operating means providing one of a leading current flow for that part of said core with a greater amount of unidirectional current saturation in its two segment leg than in the other two segment leg of said other part, and of a lagging current flow for that part with a lesser amount of unidirectional current saturation in its two segment leg than in the other two segment leg of said other part, said lagging current flow being equal to the excess current drawn by the unidirectional current windings on the two segment leg having a greater amount of unidirectional current saturation over the current drawn by the unidirectional current windings on the two segment leg with the lesser amount of unidirectional current saturation.

7. The transformer apparatus of claim 2 characterized by said operating means comprising an alternating current control winding on each of said legs comprising two segments, a variable impedance network electrically connected to each of said alternating current control windings, one of said alternating current control windings and its variable impedance network being separate and independent electrically from the other alternating current control winding and its variable impedance network.

8. The transformer apparatus of claim 2 characterized by said operating means comprising an alternating current control winding on each of said legs comprising two segments, a variable impedance network electrically connected to said alternating current control windings, said alternating current control windings being connected series opposing.

9. The transformer apparatus of claim 6 characterized by said operating means which provides said leading current flow being at least one capacitor and by said operating means which provides said lagging current flow being at least one variable impedance network.

10. Variable voltage transformer apparatus for providing substantially constant output voltage under load comprising first and second transformers each including a primary alternating current winding capable of withstanding full applied voltage, said two primary windings being disposed upon a common magnetizable core having two parts and a center leg, each of said parts having a leg comprising two segments disposed in parallel magnetically, said two primary windings being series connected and disposed with one winding on each of said two parts, a secondary alternating current winding on one of one of said parts and of said center leg, each two segment leg having a unidirectional current winding on each segment with said unidirectional current windings on said two segments of each leg being connected series opposing, said unidirectional windings on each of said two segment legs being connected to means for individually regulating the amount of unidirectional current flowing therethrough so that each two segment leg is adapted to be controllably saturated by its unidirectional current windings.

11. The transformer apparatus of claim 10 characterized by a second secondary alternating current winding connected in series with said secondary alternating current winding and disposed on the other of said center leg and of one of said two parts.

12. The transformer apparatus of claim 10 characterized by operating means in effective electrical disposition with one of each of said two parts of said core and of each of said primary windings for effecting correction of voltage drop and distortion of wave form in the secondary circuit caused by unequal amounts of unidirectional flux in said two segment legs.

13. The transformer apparatus of claim 10 characterized by said center leg comprising two segments disposed in parallel magnetically, a unidirectional current winding on each of said two segments, said unidirectional current windings being connected series opposing and connected to said means for individually regulating the amount of unidirectional current flowing therethrough to controllably saturate said center leg.

14. The transformer apparatus of claim 10 characterized by one of said segments of each of said legs comprising two segments having a few more turns of said unidirectional current winding than the other segment of its leg to overcome alternating current wave form distortion resulting from dissimilar magnetic structure.

15. The transformer apparatus of claim 10 characterized by one of said segments of each of said legs comprising two segments having a part with a different amount of cross-sectional area than the cross-sectional area of said other segment to overcome alternating current wave form distortion resulting from dissimilar magnetic structure.

16. The transformer apparatus of claim 11 characterized by operating means in effective electrical disposition with one of each of said two parts of said core and of each said primary windings for effecting correction of voltage drop and distortion of wave form in the secondary circuit caused by unequal amounts of unidirectional flux in said two segment legs.

17. The transformer apparatus of claim 11 characterized by said center leg comprising two segments disposed in parallel magnetically, a unidirectional current winding on each of said two segments, said unidirectional current windings being connected series opposing and connected to said means for individually regulating the amount of unidirectional current flowing therethrough to controllably saturate said center leg.

18. The transformer apparatus of claim 11 characterized by one of said segments of each of said legs comprising two segments having a few more turns of said unidirectional current winding than the other segment of its leg to overcome alternating current wave form distortion resulting from dissimilar magnetic structure.

19. The transformer apparatus of claim 11 characterized by one of said segments of each of said legs comprising two segments having a part with a different amount of cross-sectional area than the cross-sectional area of said other segment to overcome alternating current wave form distortion resulting from dissimilar magnetic structure.

20. The transformer apparatus of claim 12 characterized by said operating means providing one of a leading current flow for that part of said core with a greater amount of unidirectional current saturation in its two segment leg than in the other two segment leg of said other part, and of a lagging current flow for that part with a lesser amount of unidirectional current saturation in its two segment leg than in the other two segment leg of said other part, said lagging current flow being equal to the excess current drawn by the unidirectional current windings of the two segment legs having a greater amount of unidirectional current saturation over the current drawn by the unidirectional current windings on the two segment leg with the lesser amount of unidirectional current saturation.

21. The transformer apparatus of claim 12 characterized by said operating means comprising an alternating current control winding on each of said legs comprising two segments, a variable impedance network electrically connected to each of said alternating current control windings, one of said alternating current control windings and its variable impedance network being separate and independent electrically from the other alternating current control winding and its variable impedance network.

22. The transformer apparatus of claim 12 characterized by said operating means comprising an alternating current control winding on each of said legs comprising two segments, a variable impedance network electrically connected to said alternating current control windings, said alternating current control windings being connected series opposing.

23. The transformer apparatus of claim 16 characterized by said operating means providing one of a leading current flow for that part of said core with a greater amount of unidirectional current saturation in its two segment leg than in the other two segment leg of said other part, and of a lagging current flow for that part with a lesser amount of unidirectional current saturation in its two segment leg than in the other two segment leg of said other part, said lagging current flow being equal to the excess current drawn by the unidirectional current windings on the two segment leg having a greater amount of unidirectional current saturation over the current drawn by the unidirectional current windings on the two segment leg with the lesser amount of unidirectional current saturation.

24. The transformer apparatus of claim 16 characterized by said operating means comprising an alternating current control winding on each of said legs comprising two segments, a variable impedance network electrically connected to each of said alternating current control windings, one of said alternating current control windings and its variable impedance network being separate and independent electrically from the other alternating current control winding and its variable impedance network.

25. The transformer apparatus of claim 16 characterized by said operating means comprising an alternating current control winding on each of said legs comprising two segments, a variable impedance network electrically connected to said alternating current control windings, said alternating current control windings being connected series opposing.

26. The transformer apparatus of claim 20 characterized by said operating means which provides said leading current flow being at least one capacitor and by said operating means which provides said lagging current flow being at least one variable impedance network.

27. The transformer apparatus of claim 23 characterized by said operating means which provides said leading current flow being at least one capacitor and by said operating means which provides said lagging current flow being at least one variable impedance network.

28. Variable voltage transformer apparatus for providing substantially constant output voltage under load comprising first and second transformers each including a primary alternating current winding capable of withstanding full applied voltage, said two primary windings being disposed upon a common magnetizable core having two parts and a center leg, one of said parts having a leg comprising two segments disposed in parallel magnetically, said center leg comprising two segments disposed in parallel magnetically, said two primary windings being connected series aiding and disposed with one winding on each of said two parts, three secondary alternating current windings disposed with one on said center leg and one on each of said two parts, said secondary winding on the center leg being connected series opposing with one of said secondary windings on one part of said core and connected series aiding with the other of said secondary windings on the other part of said core, each two segment leg having a unidirectional current winding on each segment with said unidirectional current windings on said two segments of each leg being connected series opposing, said unidirectional windings on each of said two segment legs being connected to a means for individually regulating the amount of unidirectional current flowing therethrough so that each two segment leg is adapted to be controllably saturated by its unidirectional current windings.

29. The transformer apparatus of claim 28 characterized by operating means in effective electrical disposition with one of one of said two parts of said core and of each of said primary windings for effecting correction of voltage drop and distortion of wave form in the secondary circuit caused by unidirectional flux in said two segment leg of said one of said two parts.

30. The transformer apparatus of claim 29 characterized by said operating means providing one of a leading current flow for that part of said core having said two segment leg and of a lagging current flow for that part of said core which lacks said two segment leg.

31. The transformer apparatus of claim 30 characterized by said operating means which provides said leading current flow being a capacitor in circuit with the primary winding of said part of said core having said two segment leg and by said operating means which provides said lagging current being a variable impedance network in circuit with the primary winding of the part of said core which lacks said two segment leg.

32. Variable voltage transformer apparatus for providing substantially constant output voltage under load comprising first and second transformers each including a primary alternating current winding capable of withstanding full applied voltage, said two primary windings being disposed upon a common magnetizable core having two parts and a center leg, one of said parts having a leg comprising two segments disposed in parallel magnetically, said center leg comprising two segments disposed in parallel magnetically, said two primary windings being connected in series and disposed with one winding on each of said two parts, a secondary alternating current winding on one of that part of said core which lacks said two segment leg and of said center leg, each two segment leg having a unidirectional current winding on each segment with said unidirectional current windings on said two segments of each leg being connected series opposing, said unidirectional current windings on each of said two segment legs being connected to means for individually regulating the amount of unidirectional current flowing therethrough so that each two segment leg is adapted to be controllably saturated by its unidirectional current windings.

33. The transformer apparatus of claim 32 characterized by operating means in effective electrical disposition with one of one of said two parts of said core and of each of said primary windings for effecting correction of voltage drop and distortion of wave form in the secondary circuit caused by unidirectional flux in said two segment leg of said one of said two parts.

34. The transformer apparatus of claim 32 characterized by one of said segments of said two segment leg having a few more turns of said unidirectional current winding than the other segment of its leg to overcome alternating current wave form distortion resulting from dissimilar magnetic structure.

35. The transformer apparatus of claim 32 characterized by one of said segments of said two segment leg having a part with a different amount of cross-sectional area than the cross-sectional area of said other segment to overcome alternating current wave form distortion resulting from dissimilar magnetic structure.

36. The transformer apparatus of claim 32 characterized by a second secondary alternating current winding connected in series with said first-mentioned secondary alternating current winding and disposed on the other of said center leg and of that part of said core which lacks said two segment leg.

37. The transformer apparatus of claim 33 characterized by said operating means providing one of a leading current flow for that part of said core having said two segment leg and of a lagging current flow for that part of said core which lacks said two segment leg.

38. The transformer apparatus of claim 37 characterized by said operating means which provides said leading current flow being a capacitor in circuit with the primary winding of said part of said core having said two segment leg and by said operating means which provides said lagging current being a variable impedance network in circuit with the primary winding of the part of said core which lacks said two segment leg.

39. The transformer apparatus of claim 36 characterized by operating means in effective electrical disposition with one of one of said two parts of said core and of each of said primary windings for effecting correction of voltage drop and distortion of wave form in the secondary circuit caused by unidirectional flux in said two segment leg of said one of said two parts.

40. The transformer apparatus of claim 39 characterized by said operating means providing one of a leading current flow for that part of said core having said two segment leg and of a lagging curent flow for that part of said core which lacks said two segment leg.

41. The transformer apparatus of claim 40 characterized by said operating means which provides said leading current flow being a capacitor in circuit with the primary winding of said part of said core having said two segment leg and by said operating means which provides said lagging current being a variable impedance network in circuit with the primary winding of the part of said core which lacks said two segment leg.

42. Variable voltage transformer apparatus for providing substantially constant output voltage under load, comprising first and second transformers each including a primary alternating current winding capable of withstanding full applied voltage, said two primary windings being disposed upon a common magnetizable core having two parts and a center leg, one of said parts having a leg comprising two segments disposed in parallel magnetically, said two primary windings being connected series aiding and disposed with one winding on each of said two parts, three secondary alternating current windings connected in series and disposed one on the center leg and one on each of said two parts, said secondary winding on said center leg being connected series aiding with said secondary winding on each of said two parts, said two segment leg having a unidirectional current winding on each segment with said unidirectional current windings being connected series opposing, means connected to said unidirectional current windings for regulating the amount of unidirectional current flowing therethrough so that said two segment leg is adapted to be controllably saturated by its unidirectional current windings, operating means in effective electrical disposition with one of one of said two parts of said core and of each of said primary windings for effecting correction of voltage drop and distortion of wave form in the secondary circuit caused by unidirectional flux in said two segment leg of said one of said two parts.

43. The transformer apparatus of claim 42 characterized by said operating means providing a leading current flow for that part of said core having said two segment leg.

44. The transformer apparatus of claim 42 characterized by said operating means providing a lagging current flow for that part of said core which lacks said two segment leg.

45. The transformer apparatus of claim 42 characterized by said operating means comprising an alternating current control winding on said leg comprising two segments, a variable impedance network electrically connected to said alternating current control winding.

46. The transformer apparatus of claim 43 characterized by said operating means being a capacitor in circuit with the primary winding of said part of said core having said two segment leg.

47. The transformer apparatus of claim 44 characterized by said operating means being a variable impedance network in circuit with the primary winding of the part of said core which lacks said two segment leg.

48. Variable voltage transformer apparatus for providing substantially constant output voltage underload comprising first and second transformers each including a primary alternating current winding capable of withstanding full applied voltage, said two primary windings being disposed upon a common magnetizable core having two parts and a center leg, each of said two parts having a leg comprising two segments disposed in parallel magnetically, said two primary windings being series connected and disposed with one winding on each of said two parts, two secondary alternating current windings disposed with one winding on each of said two parts and connected series opposing, each two segment leg having a unidirectional current winding on each segment with said unidirectional current windings on said two segments of each leg being connected series opposing, said unidirectional windings on each of said two segment leg being connected to means for individually regulating the amount of unidirectional current flowing therethrough so that each two segment leg is adapted to be controllably saturated by its unidirectional current windings.

49. The transformer apparatus of claim 48 characterized by operating means in effective electrical disposition with one of each of said two parts of said core and of each of said primary windings for effecting correction of voltage drop and distortion of wave form in the secondary circuit caused by unequal amounts of unidirectional flux in said two segment legs.

50. The transformer apparatus of claim 48 characterized by said center leg comprising two segments disposed in parallel magnetically, a unidirectional current winding on each of said two segments, said unidirectional current windings being connected series opposing and connected to said means for individually regulating the amount of unidirectional current flowing therethrough to controllably saturate said center leg.

51. The transformer apparatus of claim 48 characterized by one of said segments of each of said legs comprising two segments having a few more turns of said unidirectional current winding than the other segment of its leg to overcome alternating current wave form distortion resulting from dissimilar magnetic structure.

52. The transformer apparatus of claim 48 characterized by one of said segments of each of said legs comprising two segments having a part with a different amount of cross-sectional area than the cross-sectional area of said other segment to overcome alternating current wave form distortion resulting from dissimilar magnetic structure.

53. The transformer apparatus of claim 49 characterized by said operating means providing one of a leading current flow for that part of said core with a greater amount of unidirectional current saturation in its two segment leg than in the other two segment leg of said other part, and of a lagging current flow for that part with a lesser amount of unidirectional current saturation in its two segment leg than in the other two segment leg of said other part, said lagging current flow being equal to the excess current drawn by the unidirectional current windings on the two segment leg having a greater amount of unidirectional current saturation over the current drawn by the unidirectional current windings on the two segment leg with the lesser amount of unidirectional current saturation.

54. The transformer apparatus of claim 49 characterized by said operating means comprising an alternating current control winding on each of said legs comprising two segments, a variable impedance network electrically connected to each of said alternating current control windings, one of said alternating current control windings and its variable impedance network being separate and independent electrically from the other alternating current control winding and its variable impedance network.

55. The transformer apparatus of claim 49 characterized by said operating means comprising an alternating current control winding on each of said legs comprising two segments, a variable impedance network electrically connected to said alternating current control windings, said alternating current control windings being connected series opposing.

56. The transformer apparatus of claim 53 characterized by said operating means which provides said leading current flow being at least one capacitor and by said operating means which provides said lagging current flow being at least one variable impedance network.

References Cited by the Examiner

UNITED STATES PATENTS

| | | | |
|---|---|---|---|
| 2,256,242 | 9/1941 | Edwards et al. | 323—60 X |
| 2,519,426 | 8/1950 | Grant | 323—56 X |
| 2,673,321 | 3/1954 | Stimler | 323—56 X |
| 2,804,583 | 8/1957 | Genuit | 323—56 X |
| 2,843,215 | 7/1958 | Streuber | 323—56 X |
| 2,866,943 | 12/1958 | Ringelman | 323—56 X |
| 2,904,743 | 9/1959 | McClain | 323—56 |

FOREIGN PATENTS 998,502   9/1951   France.

LLOYD McCOLLUM, *Primary Examiner.*

W. E. RAY, J. M. THOMPSON, *Assistant Examiners.*